United States Patent
Ell et al.

(10) Patent No.: US 10,043,404 B2
(45) Date of Patent: Aug. 7, 2018

(54) METHOD AND SYSTEM FOR AIRCRAFT TAXI STRIKE ALERTING

(71) Applicant: Rosemount Aerospace Inc., Burnsville, MN (US)

(72) Inventors: Todd Ell, Savage, MN (US); Robert Rutkiewicz, Edina, MN (US); Joseph T. Pesik, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/385,224

(22) Filed: Dec. 20, 2016

(65) Prior Publication Data

US 2017/0301250 A1    Oct. 19, 2017

Related U.S. Application Data

(60) Provisional application No. 62/324,188, filed on Apr. 18, 2016.

(51) Int. Cl.
*B64D 47/02* (2006.01)
*G08G 5/04* (2006.01)
(Continued)

(52) U.S. Cl.
CPC ............ *G08G 5/045* (2013.01); *B64D 43/00* (2013.01); *B64D 47/02* (2013.01); *B64D 47/08* (2013.01);
(Continued)

(58) Field of Classification Search
CPC .......... G08G 5/045; G08G 5/065; G06T 7/50; B64D 43/00; B64D 47/02; B64D 47/08;
(Continued)

(56) References Cited

U.S. PATENT DOCUMENTS 4,276,029 A * 6/1981 Gilson .................. G09B 9/302
434/43
6,405,975 B1    6/2002 Sankrithi et al.
(Continued)

FOREIGN PATENT DOCUMENTS

CA    2464791 A1    10/2004
CA    2737189 A1    10/2011
(Continued)

OTHER PUBLICATIONS

Raskar et al., Multi-projector displays using camera-based registration, 1999, IEEE, p. 1-9 (Year: 1999).*
(Continued)

*Primary Examiner* — Mcdieunel Marc
(74) *Attorney, Agent, or Firm* — Kinney & Lange, P.A.

(57) ABSTRACT

Apparatus and associated methods relate to ranging an object nearby an aircraft by triangulation of spatially-patterned light projected upon and reflected from the object. The spatially patterned light can have a wavelength corresponding to infrared light and/or to an atmospheric absorption band. In some embodiments, images of the object are captured both with and without illumination by the spatially-patterned light. A difference between these two images can be used to isolate the spatially-patterned light. The two images can also be used to identify pixel boundaries of the object and to calculate ranges of portions of the object corresponding to pixels imaging these portions. For pixels imaging reflections of the spatially-patterned light, triangulation can be used to calculate range. For pixels not imaging reflections of the spatially-patterned light, ranges can be calculated using one or more of the calculated ranges calculated using triangulation corresponding to nearby pixels.

20 Claims, 5 Drawing Sheets

(51) Int. Cl.
*B64D 43/00* (2006.01)
*B64D 47/08* (2006.01)
*G01S 17/89* (2006.01)
*G06K 9/00* (2006.01)
*G08G 5/06* (2006.01)
*B64F 1/00* (2006.01)
*G06T 7/50* (2017.01)

(52) U.S. Cl.
CPC ............. *B64F 1/002* (2013.01); *G01S 17/89* (2013.01); *G06K 9/00624* (2013.01); *G06K 9/00805* (2013.01); *G06T 7/50* (2017.01); *G08G 5/065* (2013.01); *B64D 2205/00* (2013.01)

(58) Field of Classification Search
CPC ..... B64D 2205/00; B64F 1/002; G01S 17/89; G06K 9/00624; G06K 9/00805
USPC .......................................................... 701/301
See application file for complete search history.

(56) References Cited

U.S. PATENT DOCUMENTS

| | | | |
|---|---|---|---|
| 6,571,166 B1 | 5/2003 | Johnson et al. | |
| 6,700,669 B1* | 3/2004 | Geng | G01L 311/2513 356/602 |
| 6,754,370 B1 | 6/2004 | Hall-Halt et al. | |
| 6,909,381 B2* | 6/2005 | Kahn | G08G 5/0021 340/945 |
| 6,937,348 B2* | 8/2005 | Geng | G01B 11/2509 356/602 |
| 7,592,929 B2 | 9/2009 | Pepitone | |
| 7,974,773 B1 | 7/2011 | Krenz et al. | |
| 9,047,771 B1 | 6/2015 | Thoreen et al. | |
| 9,174,746 B1 | 11/2015 | Bell et al. | |
| 9,245,450 B1 | 1/2016 | Chiew et al. | |
| 9,401,094 B2 | 7/2016 | Cros et al. | |
| 9,754,167 B1* | 9/2017 | Holz | G06K 9/00671 |
| 9,817,159 B2* | 11/2017 | Hudman | G01L 311/2513 |
| 2007/0241936 A1 | 10/2007 | Arthur et al. | |
| 2008/0062011 A1* | 3/2008 | Butler | G01S 3/783 340/961 |
| 2010/0094487 A1 | 4/2010 | Brinkman | |
| 2012/0242795 A1* | 9/2012 | Kane | G01L 311/2513 348/46 |
| 2014/0092206 A1 | 4/2014 | Boucourt et al. | |
| 2014/0142838 A1* | 5/2014 | Durand | G08G 5/04 701/301 |
| 2015/0142214 A1 | 5/2015 | Cox et al. | |
| 2016/0127334 A1* | 5/2016 | Bangole | H04L 63/0428 713/171 |
| 2016/0247406 A1* | 8/2016 | Khatwa | G05D 1/0061 |
| 2016/0351061 A1* | 12/2016 | Lamkin | G08G 5/065 |
| 2017/0301250 A1 | 10/2017 | Ell et al. | |
| 2017/0334578 A1 | 11/2017 | Fleck et al. | |

FOREIGN PATENT DOCUMENTS

| | | |
|---|---|---|
| CN | 105391975 A | 3/2016 |
| EP | 0980828 A1 | 2/2000 |
| EP | 1842772 A2 | 10/2007 |
| EP | 1927965 A2 | 6/2008 |
| EP | 2187372 A1 | 5/2010 |
| EP | 2426461 A2 | 3/2012 |
| EP | 2495168 A1 | 9/2012 |
| EP | 2565861 A2 | 3/2013 |
| EP | 2685442 A2 | 1/2014 |
| EP | 2892040 A1 | 7/2015 |
| WO | 2009010969 A2 | 1/2009 |
| WO | 2013063392 A1 | 5/2013 |
| WO | 2013181334 A1 | 12/2013 |

OTHER PUBLICATIONS

Pierpaoli et al., Altering UAV flight path by threatening collision, 2015, IEEE, p. 4A4-4 to A44-10 (Year: 2015).*
Zsedrovits et al., Visual Detection and Implementation Aspects of a UAV See and Avoid System, 2011, IEEE, p. 472-475 (Year: 2011).*
Albaker et al., A survey of collision avoidance approaches for unmanned aerial vehicles, 2009, IEEE, p. 1-7 (Year: 2009).*
Extended European Search Report, for European Patent Application No. 17160943.1, dated Aug. 23, 2017, 9 pages.
International Civil Aviation Organization, "Aerodrome Standards: Aerodrome Design and Operations", ICAO: Cooperative Development of Operational Safety and Continuing Airworthiness, dated Jul. 1999, 194 pages.
International Civil Aviation Organization, "Airport Markings: ICAO & U.S. Requirements", ICAO: Federal Aviation Administration, dated Jun. 2012, 19 pages.
U.S. Department of Transporation, "Advisory Circular", U.S. DOT: Federal Aviation Administration, dated Sep. 27, 2013, 144 pages.
Xu, Lun Hui et al., "A New Lane Department Warning Algorithm Considering the Driver's Behavior Characteristics", Hindawi Publishing Corporation: Mathematical Problems in Engineering, dated Jul. 26, 2015, 12 pages.
Federal Aviation Administration, "A Quick Reference to Airfield Standards", FAA: Southern Region Airports Division, dated Jan. 2018, 69 pages.

* cited by examiner

METHOD AND SYSTEM FOR AIRCRAFT TAXI STRIKE ALERTING

BACKGROUND

Each year, significant time and money are lost due to commercial aircraft accidents and incidents during ground operations, of which significant portions occur during taxiing maneuvers. During ground operations, aircraft share the taxiways with other aircraft, fuel vehicles, baggage carrying trains, mobile stairways and many other objects. Aircrafts often taxi to and/or from fixed buildings and other fixed objects. Should an aircraft collide with any of these objects, the aircraft must be repaired and recertified as capable of operation. The cost of repair and recertification, as well as the lost opportunity costs associated with the aircraft being unavailable for use can be very expensive.

Pilots are located in a central cockpit where they are well positioned to observe objects that are directly in front of the cabin of the aircraft. Wings extend laterally from the cabin in both directions. Some commercial and some military aircraft have large wingspans, and so the wings on these aircraft laterally extend a great distance from the cabin and are thus positioned behind and out of the field of view of the cabin. Some commercial and some military planes have engines that hang below the wings of the aircraft. Pilots, positioned in the cabin, can have difficulty knowing the risk of collisions between the wingtips and/or engines and other objects external to the aircraft. An aircraft on-ground collision alerting system would be useful to survey the area forward or aft of the tail, wingtips and/or engines, to detect obstructions in a potential collision path, and to provide visual and audible alerts to the cockpit.

SUMMARY

Apparatus and associated devices relate to an aircraft collision alerting system that includes one or more light projectors mounted at one or more projector locations on an aircraft. The one or more light projectors are configured to project spatially-patterned light from the one or more light projectors onto a scene external to the aircraft, thereby illuminating a spatially-patterned portion of the scene. The aircraft collision alerting system includes one or more cameras mounted at one or more camera locations on an aircraft, respectively. Each of the one or more cameras is configured to receive light reflected from the scene. Each of the one or more cameras is further configured to focus the received light onto a focal plane array comprising a plurality of light-sensitive pixels, thereby forming an image of the scene. The image of the scene includes pixel data generated by the plurality of light-sensitive pixels. The aircraft collision alerting system includes an image processor configured to identify pixel coordinates corresponding to a subset of the plurality of light-sensitive pixels upon which the spatially-patterned light projected by the one or more light projectors and reflected from the spatially-patterned portion of the scene is focused. The image processor is further configured to use triangulation, based on the one or more projector locations of the one or more light projectors, the one or more camera locations of the one or more cameras and the identified pixel coordinates, to calculate position values and range data of object(s) in the scene from which the spatially-patterned light projected by the light projector is reflected.

Some embodiments relate to a method for generating an alert signal of a potential aircraft collision. The method includes projecting light of a spatial pattern from one or more projector locations onto a scene, thereby illuminating a spatially-patterned portion of the scene. The method includes receiving light reflected from the scene. The method includes focusing the received light onto a focal plane array comprising a plurality of light-sensitive pixels, thereby forming an image of the scene. The image of the scene includes pixel data generated by the plurality of light-sensitive pixels. The method includes identifying pixel coordinates corresponding to pixels upon which the projected light of the spatial pattern and reflected from the spatially-patterned portion of the scene is focused. The method also includes calculating spatial location values and range value data of object(s) in the scene from which light of the spatial pattern projected from the one or more projector locations is reflected. Calculating spatial location values and range value data of object(s) in the scene is based on the one or more projector locations, a location at which the light reflected from the scene is received and focused, and the identified pixel coordinates.

DETAILED DESCRIPTION

Apparatus and associated methods relate to ranging an object nearby an aircraft using triangulation of spatially-patterned light projected upon and reflected from the nearby object. The spatially patterned light can have a wavelength corresponding to infrared light and/or to an atmospheric absorption band. Using infrared light can minimize a distraction to a pilot who is taxiing the aircraft. Using infrared light that is of lower solar intensity can permit low-power projector illumination, as the illuminating power need not compete with the sun's illumination in some spectral bands. Projectors using IR spectrum that has solar illumination absorbed by the atmosphere can further reduce the required illumination. Knowing a first aircraft location from where the light is projected, a second aircraft location where the reflection is imaged, and a location within the image corresponding to a feature of the spatially patterned light permits a calculation of the location and range of the illuminated object.

In some embodiments, images of the object are captured both with and without illumination by the spatially-patterned light. A difference between these two images can be used to help isolate the reflections of the spatially-patterned light. The two images can also be used in tandem to identify pixel boundaries of the object and to calculate range values of portions of the object corresponding to pixels imaging these portions. For pixels imaging reflections of the spatially-patterned light, triangulation can be used to calculate range. For pixels not imaging reflections of the spatially-patterned light, range can be calculated using one or more calculated ranges corresponding to nearby pixels imaging the spatially-patterned light reflected from the object. Using these two ranging techniques provides pixel level resolution of location values, while requiring only sparse illumination of objects by spatially-patterned light.

Figure 1:
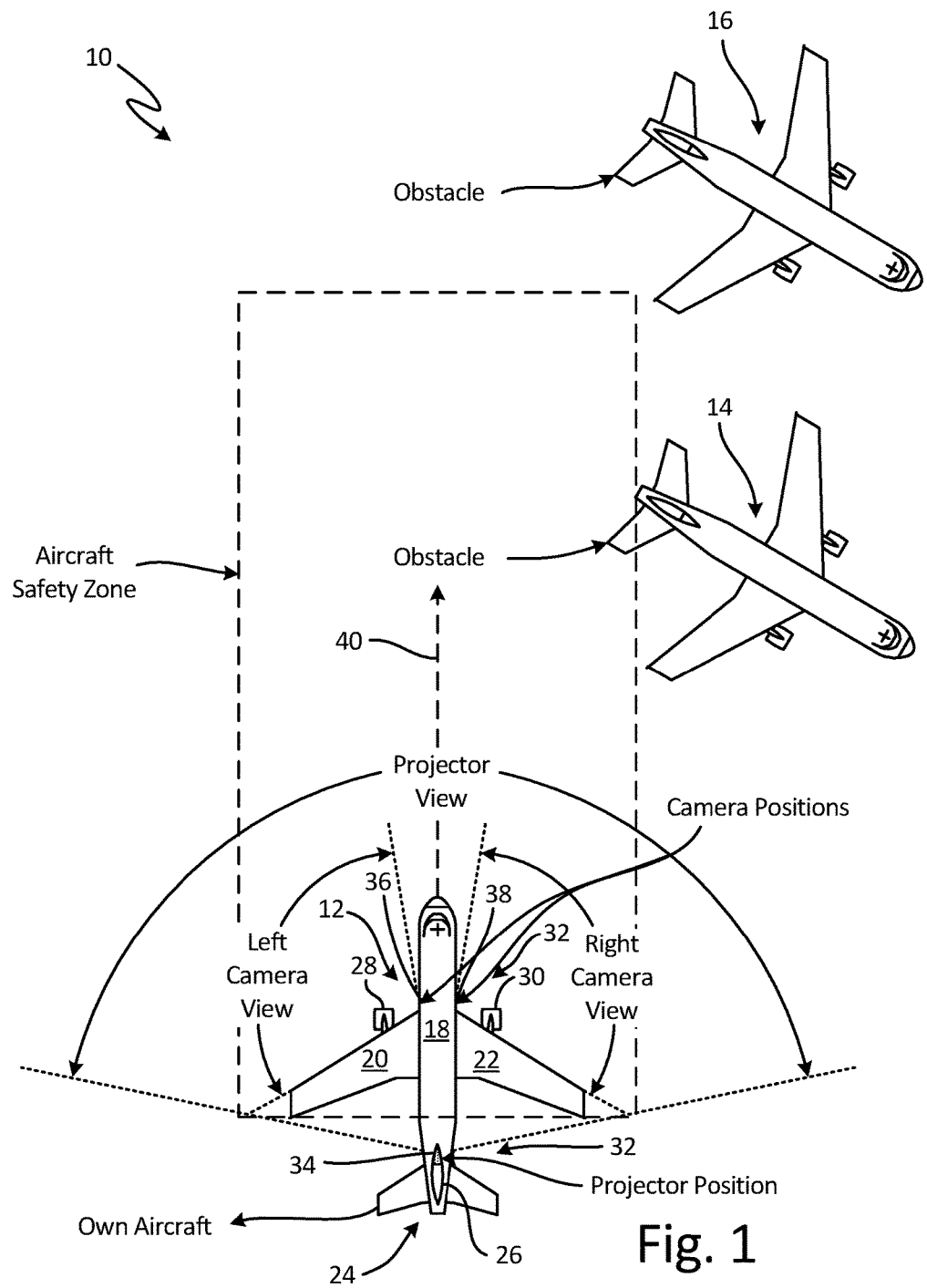
FIG. 1 is a schematic view of an exemplary aircraft collision alerting system used by a aircraft during on-ground operations.

FIG. 1 is a schematic view of an exemplary aircraft collision alerting system used by a taxiing aircraft. In FIG. 1, aircraft taxi scenario 10 includes taxiing aircraft 12 and two parked aircraft 14, 16. Taxiing aircraft 12 has cabin 18, left wing 20, right wing 22 and tail 24. Tail 24 has vertical stabilizer 26. Left engine 28 hangs from left wing 20, and right engine 30 hangs from right wing 22. Taxiing aircraft 12 is equipped with one embodiment of aircraft collision alerting system 32. Aircraft collision alerting system 32 includes light projector 34 left-side camera 36, and right-side camera 38. In the depicted embodiment, light projector 34 is mounted on vertical stabilizer 26 of tail 24. Light projector 34 is configured to project a structured image onto a scene external to taxiing aircraft 12, thereby illuminating objects nearby and external to taxiing aircraft 12. Light projector 34 can be mounted at other locations on taxiing aircraft 12.

Light projector 34 projects the structured image over a solid angle of illumination. The structured image illuminates objects that reside within the solid angle of illumination. In the depicted embodiment, light projector 34 has an optical axis that is coplanar with cabin axis 40 of taxiing aircraft 12. Light projector 34 is shown illuminating objects that are within an azimuthal range of +/−85 degrees, for example, of cabin axis 40 of taxiing aircraft 12, and within an elevation range of a projection horizon of light projector 34. The elevation range of projection, for example, can be from about +3, +5, +10, +12, or +15 degrees to about −2, −5, −8, or −10 degrees of projection from a vertical location of light projector 34, sufficient to encompass the wingtips of left wing 20 and right wing 22, as well as a plane extending forward of these wingtips parallel to cabin axis 40.

In some embodiments, the structured image can continuously illuminate objects within the solid angle of illumination. In other embodiments, the structured image can intermittently illuminate objects within the solid angle of illumination. Such illumination may use light of various wavelengths. For example, in some embodiments, infrared light, being invisible to humans, can be used to provide illumination of objects within the solid angle of illumination. Infrared light can advantageously be non-distractive to pilots and to other people upon whom the structured image is projected.

In some embodiments, the spatially-patterned light is on for a limited time, with image capture synchronized with the projector illumination. Shorter image capture durations reduce the light captured from solar illumination, lowering the needed projector power. In some embodiments, the image captures only changes in light level with optimal capture at specific frequencies of light intensity variation. The projector generates a high speed variation in light intensity that matches the frequency at which the image capture is most sensitive. In some embodiments, the image capture is sensitive to the total amount of light captured.

In some embodiments, light having wavelengths within an atmospheric absorption band can be used. Careful selection of projector wavelength can permit the projector to compete less with the solar energy. There are, however, certain wavelengths where the atmospheric absorption is so great that both projector energy and solar energy are attenuated equally. Light is broadband as emitted from the sun with a maximum intensity falling in the visible light spectrum. Sunlight having wavelengths within the infrared spectrum is of lower intensity than the visible band. And so, projected light having such wavelengths need not compete with the sunlight. Using light having such wavelengths can thereby permit reduced power levels in projecting structured images. Atmospheric absorption bands may further reduce solar infrared illumination. For example, atmospheric absorption bands include infrared wavelengths of between about 1.35-1.4, 1.8-1.95, 2.5-2.9, and between 5.5-7.2 microns.

The structured imaged that is projected by light projector 34 has features that can be identified in images formed by cameras 36, 38. Using knowledge of the location from which the feature is projected (e.g., the location of image projector 34), the location of the cameras 36, 38 and the location within the images (e.g., pixel coordinates) where the feature is imaged can permit location determination using triangulation. For example, light projector 34 can be located at an elevation on taxiing aircraft 12 that is higher than an elevation where cameras 36, 38 are located. A location of the imaged feature can be used to determine a location and a range distance to the object from which that specific feature is reflected.

Light projector 34, for example, can project a structured image that includes a pattern of horizontal lines projecting at various angles of elevation from light projector 34. One horizontal line might be projected at an angle of elevation of zero degrees (i.e., directed parallel to the horizon). A second horizontal line might be projected at an angle of negative five degrees from the horizon (i.e., directed at a slightly downward angle from light projector 34). Each of these projected horizontal lines of light, when reflected from an object, will be imaged at a different vertical location (e.g., each will have a different vertical pixel coordinate) within the camera image, depending on the range distance between the reflecting object and taxiing aircraft 12. Knowing the elevation of light projector 34, the elevations of cameras 36, 38, the specific feature of the structured image (e.g., which horizontal line is imaged), and the location within the camera image where the specific feature is imaged can permit a determination of the location of the object from which the specific feature has been reflected.

Using the calculated location information, pilots taxiing aircraft 12 can be informed of any potential collision hazards within the scene illuminated by light projector 34. Pilots of taxiing aircraft 34 can steer aircraft 34 to avoid wingtip collisions and/or engine collisions based on the location and range information that is calculated by aircraft collision alerting system 32.

Figure 2:
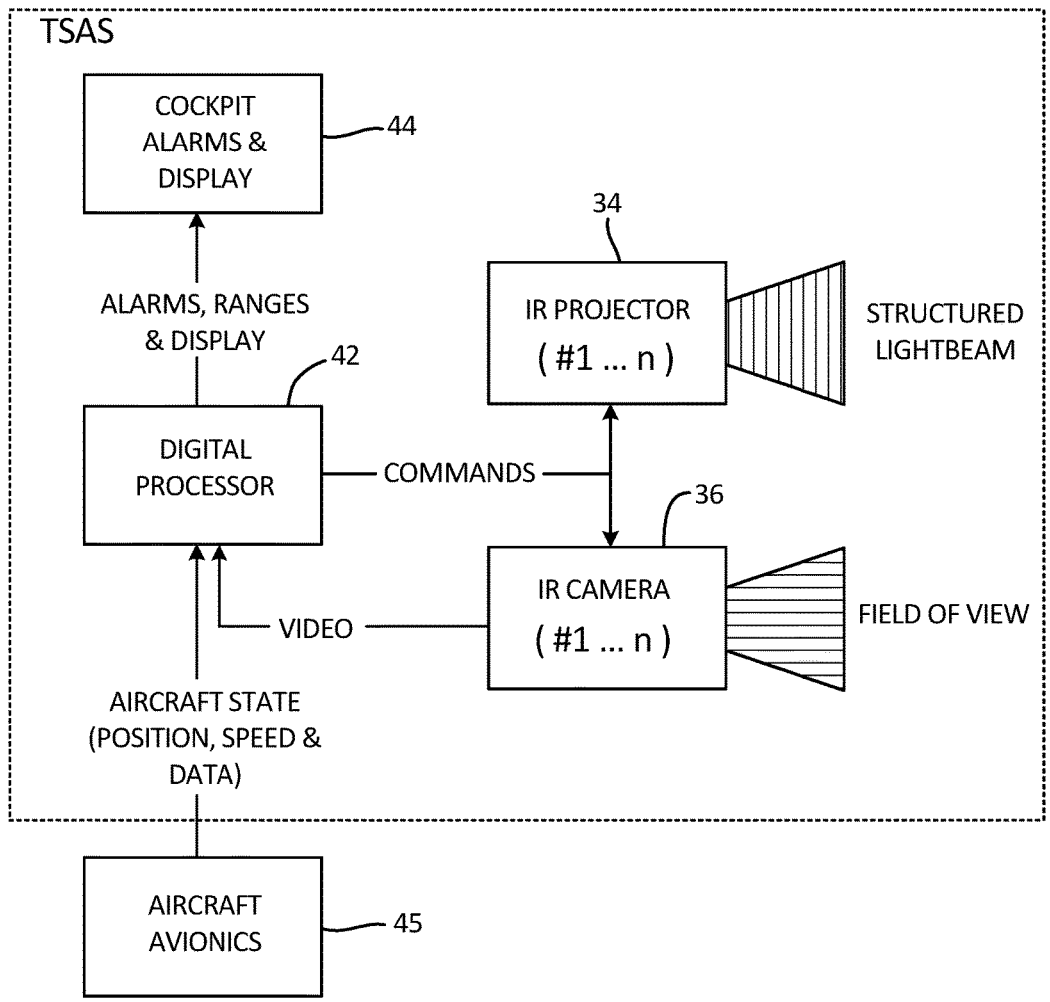
FIG. 2 is a block diagram of an exemplary aircraft collision alerting system.

FIG. 2 is a block diagram of an exemplary aircraft collision alerting system. Aircraft collision alerting system 32 includes infrared projector(s) 34, camera(s) 36, image processor 42, and cockpit alarm and display module 44. Infrared projector(s) 34 is configured to be mounted at a projector location on an aircraft. Infrared projector(s) 34 is further configured to project spatially-patterned light from infrared projector(s) 34 onto a scene external to the aircraft, thereby illuminating a spatially-patterned portion of the scene.

Camera(s) 36 is configured to be mounted at one or more camera locations on the aircraft. Camera(s) 36 is further configured to receive light reflected from the scene. Camera(s) 36 is further configured to focus the received light onto a focal plane array comprising a plurality of light-sensitive pixels, thereby forming an image of the scene. The image can include pixel data generated by the plurality of light-sensitive pixels.

Digital processor 42 receives inputs from camera(s) 36 and from aircraft avionics 45. Digital processor 42 generates commands that control the operation of infrared projector(s) 34 and camera(s) 36. Digital processor 42 outputs alarms ranges and images to cockpit alarms and display module 44. Digital processor 42 is configured to identify pixel coordinates corresponding to a subset of the plurality of light-sensitive pixels upon which the spatially-patterned light projected by infrared projector(s) 34 and reflected from the spatially-patterned portion of the scene is focused. Digital processor 42 is further configured to use triangulation, based on the projector location of infrared projector(s) 34, the location(s) of camera(s) 36 and the identified pixel coordinates, to calculate range value data of object(s) in the scene from which the spatially-patterned light projected by infrared projector(s) 34 is reflected.

Figure 3:
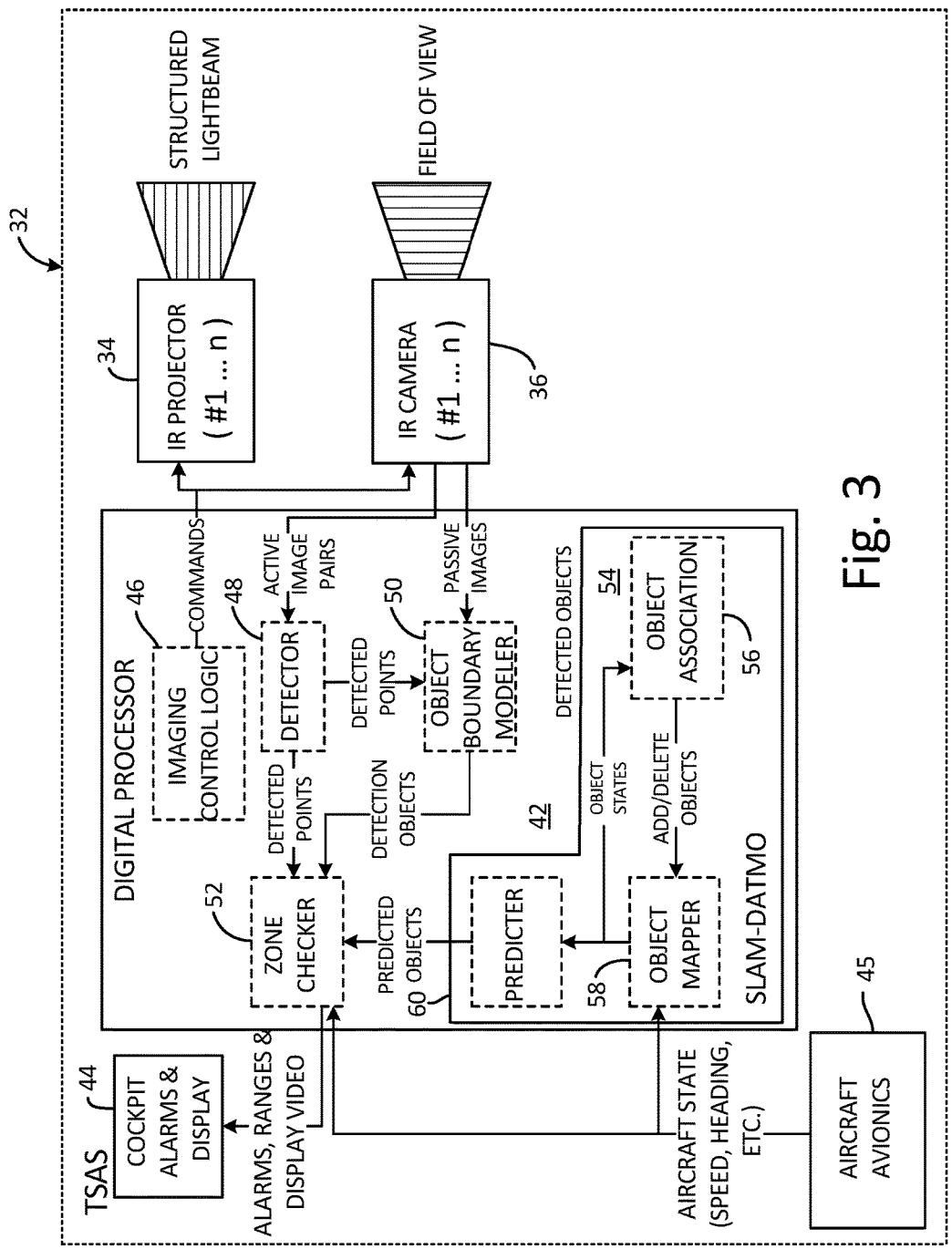
FIG. 3 is a detailed block diagram of the exemplary aircraft collision alerting system depicted in FIG. 2.

FIG. 3 is a detailed block diagram of the exemplary aircraft collision alerting system depicted in FIG. 2. Aircraft collision alerting system 32 includes infrared projector(s) 34, camera(s) 36, image processor 42, and cockpit alarm and display module 44. Infrared projector(s) 34 is configured to be mounted at a projector location on an aircraft. Infrared projector(s) 34 is further configured to project spatially-patterned light from infrared projector(s) 34 onto a scene external to the aircraft, thereby illuminating a spatially-patterned portion of the scene. Image processor 42 is shown in greater detail than shown in FIG. 2.

Image processor 42 includes imaging control logic 46, detector 48, object boundary modeler 50, zone checker 52 and Simultaneous Localization And Mapping (SLAM) and Detection And Tracking of Moving Objects (DATMO) module 54. Image control logic 46 can generate commands that control operation of infrared projector(s) 34 and camera(s) 36. For example, imaging control logic 46 can control a timing of when infrared projector(s) 34 generates a structured image and projects the structured image upon a scene external to the aircraft. Imaging control logic 46 can control a timing of when camera(s) 36 generates images of the scene. Such timing coordination can be used to ensure that images generated by camera(s) 36 contain and/or exclude structured images projected from infrared projector(s) 34, for example.

Detector 48 is configured to receive the images generated by camera(s) 36. Detector 48 is further configured to identify locations within the received images that include light of the projected structured image reflected from an object in the scene. Detector 48 is further configured to identify the specific features of the structured image corresponding to the identified locations. For example, detector 48 may identify a first subset of the plurality of pixels of the image as being associated with a first horizontal line, and a second subset of the plurality of pixels with a second horizontal line.

Detector 48 can use image pairs in identifying locations within the received images that include light of the projected structured image reflected from an object in the scene. For example, a first image of the received image pair can be generated by camera(s) 36 at a time when infrared projector(s) 34 is not illuminating the scene. A second image of the received image pair can be generated by camera(s) 36 at a time when infrared projector(s) 34 is illuminating the scene. These second images of the received image pairs thereby contain light projected by infrared projector(s) 34 and reflected from the objects in the scene. Conversely, the first images of the received image pairs do not contain light projected by infrared projector(s) 34 and reflected from the objects in the scene, but only light reflected from the objects that is projected thereon from other sources. Detector 48 can generate a difference image based on a difference between the first and second images of each image pair. This technique can reduce the pixel response of light reflected from the objects that is projected thereon from these other sources. In some embodiments, negative values generated by taking the difference between the first and second images of these image pairs are set to zero.

Various methods for identifying the features imaged by camera(s) 36 can be used. In some embodiments, each feature is encoded by modulating the intensity of that feature in time domain and/or in the spatial domain. For example, each horizontal line can be encoded in the time domain using amplitude modulation. In some embodiments, each horizontal line can be encoded differently in the spatial domain as different dashed patterns, for example. In some embodiments each feature may be illuminated at a different time. Multiple images can be generated by the camera, so as to sequentially capture each of the separately timed features. In some embodiments, different frequencies of light can be used for different features.

Object boundary modeler 50 receives the structured image locations identified by detector 50. Object boundary modeler 50 also receives the passive images (e.g., those images that do not contain light projected by infrared projector(s) 34) from camera(s) 36. Object boundary modeler 50 determines pixel boundaries of various objects imaged in passive images received by camera(s) 36. Object boundary modeler 50 may use local groupings of the received structured image locations and the corresponding calculated locations corresponding to these structured image locations to identify separate structures or a continuum of a single structure. For example, local groupings of identified structured image locations that have similar corresponding locations might be associated with a common object. The passive image can be processed using various boundary and/or edge detection algorithms to identify potential object boundaries. Local groupings having similar corresponding calculated ranges can be used to annotate objects with identified boundary edges. The passive images with identified boundary edges can be used to show the spatial extent of the ranged objects. Object boundary modeler can be used to interpolate the range of every pixel within the identified boundary edges using the nearby members of the grouping of calculated ranges.

Zone checker 52 receives the identified boundaries of ranged objects from object boundary modeler 50. Zone checker 52 then compares the location and range of such objects with the taxi path of taxiing airplane 12 and determines a collision risk score. If, for example, the collision risk score exceeds a predetermined value, then zone checker 52 may generate an alert signal and output it to cockpit alarms and display module 44. Zone checker may also output passive images annotated with range values corresponding to detected objects for visual display on a display screen of cockpit alarms and display module 44.

Zone checker 52 can use a zone or multiple zones in determining a risk score. A zone, for example, can be a keep-out box surrounding the aircraft or some portion of the aircraft. Any object detected to be within the keep-out zone can cause zone checker 52 to generate an alert signal. In some embodiments, a series of zones around key aircraft components may be used, such as, for example, around wing-tips and/or engines. These zones can extend above and/or below the occupied region of these aircraft components to include a safety margin in elevation. These zones can also extend forward/aft or inboard/outboard of the aircraft components to provide safety margin in the direction of a plane trajectory. A volume of an audible alert signal can be adapted to the closing speed and/or range of the objects which are on a collision course with taxiing aircraft 12. For example, a risk score may be increased for an object in a forward zone as the speed of taxiing aircraft 12 increases. In some embodiments, a lateral danger zone for objects located laterally from the wingtips of taxiing aircraft 12 can be reduced as taxiing aircraft 12 slows down to permit the pilot to crawl past objects in tight quarters.

SLAM-DATMO module 54 is configured to track the detected and ranged objects. SLAM-DATMO module 54 receives the object boundaries detected by object boundary modeler 50 and receives the location values of such objects as inputs. In some embodiments, SLAM-DATMO module 54 also receives the passive images generated by camera(s) 36. SLAM-DATMO module 54 includes object association module 56, object mapping module 58, and predictor module 60. Object association module 56 associates detected objects in a current frame of a passive image with corresponding detected objects in a previous frame of a passive image. Using different frames of passive images, SLAM-DATMO module 54 can track a lateral movement (e.g., in the x and y pixel coordinate directions) and the range movement (e.g., toward or away from taxiing aircraft 12) of the detected objects. Using aircraft inputs, SLAM-DATMO module 54 can determine if the detected objects are stationary or moving. This information, in conjunction with outputs from object body modeler 50, can enhance ability to characterize object type. Predictor 60 can then use this information along with the past and current movements of the detected objects to predict future locations and movements of these detected objects. Predictor 60 can then output these future predictions to zone checker 52 for use in identifying a collision risk score. In some embodiments, predictor 60 can predict a time to impact of the aircraft and the detected objects.

Figure 4:
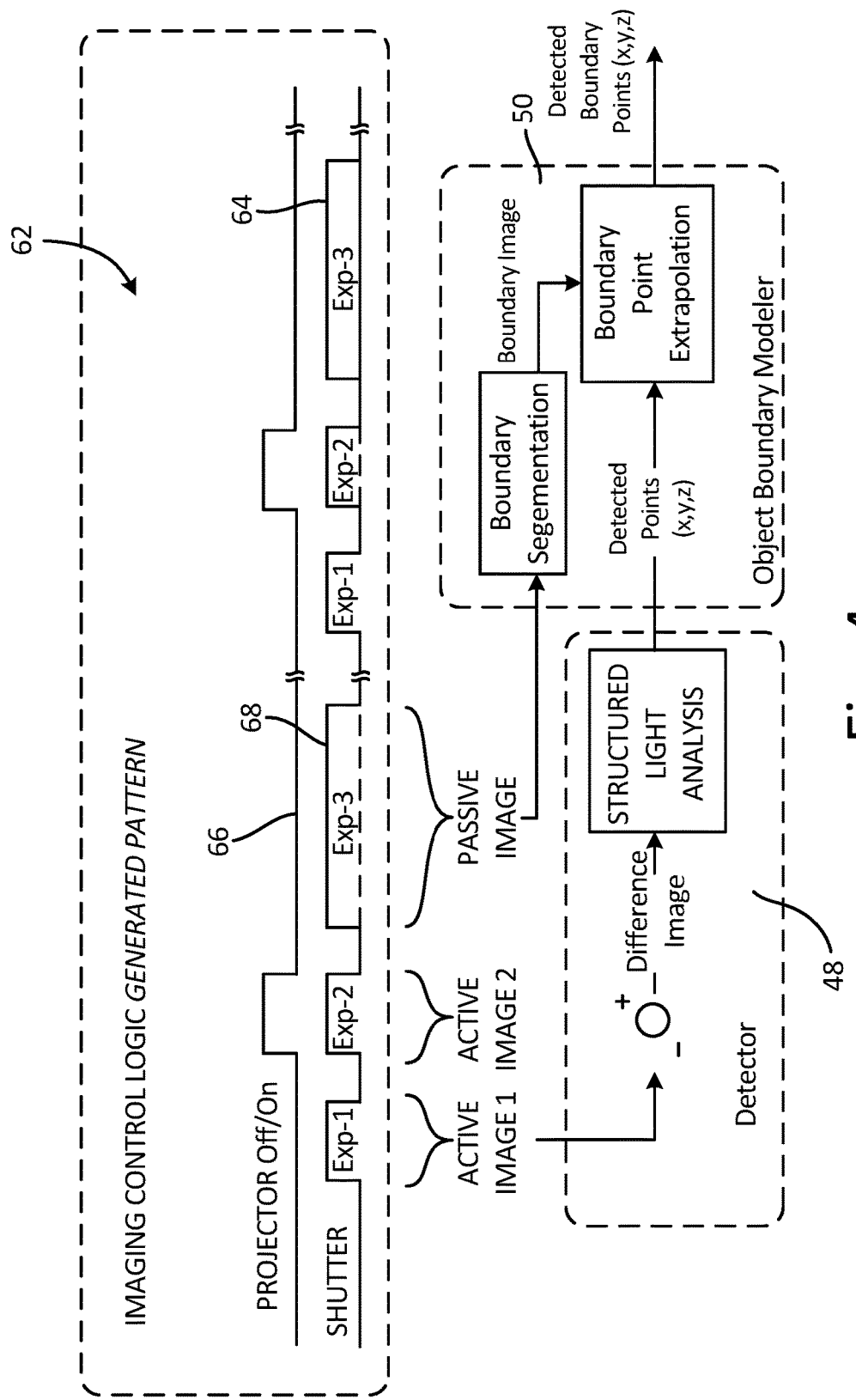
FIG. 4 is a timing diagram depicting the timing of various operations of the exemplary aircraft collision alerting system depicted in FIGS. 2-3.

FIG. 4 is a timing diagram depicting the timing of various operations of the exemplary aircraft collision alerting system depicted in FIGS. 2-3. In FIG. 4, timing diagram 62 has horizontal axis 64. Horizontal axis 64 corresponds to time. Timing diagram 62 includes light projector timing signal 66 and camera exposure timing signal 68. Light projector timing signal 66 controls the projection of a structured image by infrared projector(s) 34. Camera exposure timing signal 68 controls the timing of image generation by camera(s) 36. Each of the control signals 66, 68 are depicted for two periodic cycles in timing diagram 62. Each periodic cycle of timing diagram 62 depicts camera exposure timing signal indicating that camera(s) 36 is commanded to obtain three different images per periodic cycle. Camera(s) 36 is commanded to generate a first image during a time span in which projector timing signal 66 commands infrared projector(s) 34 to be in an off state. Camera(s) 36 is commanded to generate a second image during a time span in which projector timing signal 66 commands infrared projector(s) 34 to project a structured image upon the scene. Camera(s) 36 is commanded to generate a third image during a time span in which projector timing signal 66 commands infrared projector(s) 34 again to be in an off state. Exposure timing of the third image may be increased to improve the quality of the third image, for example.

FIG. 4 also depicts detector 48 receiving the first and second images generated by camera(s) 36. Detector 48 generates a difference image by subtracting the first image from the second image. Detector 48 then performs structured light analysis on the difference image so generated. The differencing technique can also be used to improve performance in raining and possibly snowing conditions by subtracting out the droplets. The structured light analysis can include determining range values for each pixel of the difference image that has an intensity value greater than a predetermined threshold. For example, for every pixel that has an intensity value that is greater than zero, a range value might be assigned.

The results of the structured light analysis are then transmitted to object boundary modeler 50. Object boundary modeler 50 also receives the third image generated by camera(s) 36. Object boundary modeler 50 performs boundary segmentation on the third image to find pixel boundaries for objects in the third image. For example, edge detection, and/or texture analysis can be used to identify different objects in the third image. Object boundary modeler 50 then uses the received results of the structured light analysis and the results of the boundary segmentation to perform boundary point extrapolation. Boundary point extrapolation can involve identifying the pixels used to calculate range values by the structured light analysis that reside within the pixel boundaries of the objects found by object boundary modeler 50. Boundary point extrapolation further can include determining range values for the pixels not used in the structured light analysis that also reside within the objects found by object boundary modeler 50. Ranges for these pixels can be determined based on the range values for nearby pixels that have already been determined by detector 48. The results of boundary point extrapolation can then be output to zone checker 52 (depicted in FIG. 3).

Figure 5:
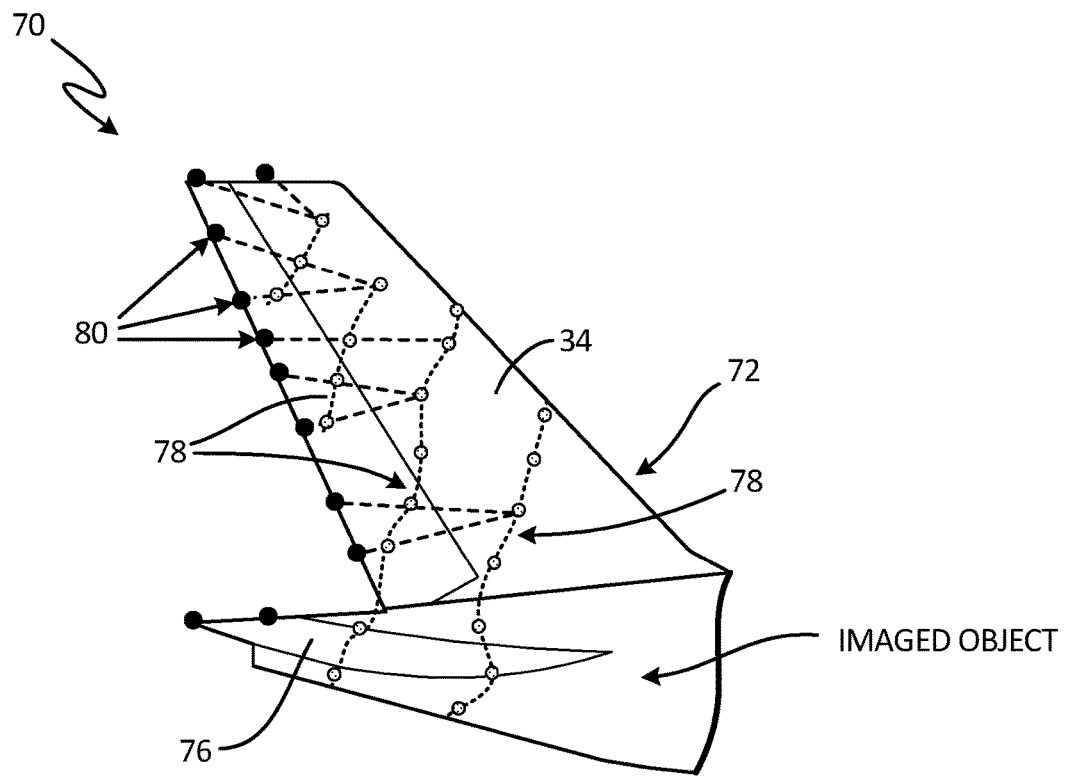
FIG. 5 is a schematic diagram depicting object location determination using both active and passive imaging.

FIG. 5 is a schematic diagram depicting object location determination using both active and passive imaging. In FIG. 5, camera image 70 of tail 72 of aircraft 14 external to taxiing aircraft 12 is shown. Camera image 70 is composed from intensity data of a two-dimensional array of light-sensitive pixels (not individually depicted). Tail 72 includes vertical stabilizer 74 and horizontal stabilizer 76. Vertical stabilizer 74 depicts features 78 of a structured image projected thereon. Features 78 are diagonal lines of light. Features 78 are imaged by a subset of the two-dimensional array of light-sensitive pixels composing the image. And for each of the subset of the two-dimensional array of light-sensitive pixels containing the structured image projected upon tail 72, a range value has been calculated.

Between the subset of pixels that have calculated range values, are pixels upon which the structured image has not been projected. For some, if not all, of these pixels, range values can be calculated using the already calculated range values corresponding to nearby pixels. For example, range values can be calculated for the pixels determined to be boundary pixels of an object. Range values for boundary pixels 80 may be calculated by modeling the range variations within a single object as a polynomial function of spatial coordinates, for example. Such a model may be used to calculate range values using the pixel coordinates and corresponding range values of pixels having already calculated range values that reside within the object boundary associated with boundary pixels 80.

Various embodiments can use various structured images having various features. For example, in some embodiments, vertical or diagonal lines can be projected upon a scene. In some embodiments, spots of light can be projected upon a scene. In an exemplary embodiment, both vertical lines and horizontal lines can be projected upon a scene, using projectors that are horizontally and/or vertically displaced, respectively, from the camera location.

The following are non-exclusive descriptions of possible embodiments of the present invention.

Apparatus and methods relate to an aircraft collision alerting system. The system includes one or more light projectors mounted at one or more projector locations on an aircraft. The one or more light projectors is configured to project spatially-patterned light from the one or more light projectors onto a scene external to the aircraft, thereby illuminating a spatially-patterned portion of the scene. The system includes one or more cameras mounted at one or more camera locations on the aircraft, respectively. Each of the one or more cameras is configured to receive light reflected from the scene, and further configured to focus the received light onto a focal plane array comprising a plurality of light-sensitive pixels, thereby forming an image of the scene. The image includes pixel data generated by the plurality of light-sensitive pixels. The system also includes an image processor configured to identify pixel coordinates corresponding to a subset of the plurality of light-sensitive pixels upon which the spatially-patterned light projected by the one or more light projectors and reflected from the spatially-patterned portion of the scene is focused. The image processor is further configured to use triangulation, based on the one or more projector locations of the one or more light projectors, the one or more camera locations of the one or more cameras and the identified pixel coordinates, to calculate position values and range data of object(s) in the scene from which the spatially-patterned light projected by the light projector is reflected.

The system of the preceding paragraph can optionally include, additionally and/or alternatively, any one or more of the following features, configurations and/or additional components:

A further embodiment of the foregoing system, wherein the spatially-patterned light can include a series of spatially-separated lines or points of light.

A further embodiment of any of the foregoing systems, wherein the spatially-patterned light projected by the light projector can include infrared light.

A further embodiment of any of the foregoing systems, wherein the spatially-patterned light projected by the light projector can include infrared light having a wavelength corresponding to a lower solar intensity portion or to an atmospheric absorption band.

A further embodiment of any of the foregoing systems, wherein the camera can be an infrared camera and the light-sensitive pixels are sensitive to infrared light.

A further embodiment of any of the foregoing systems can further include a cockpit notification system configured to generate an alert signal if the calculated position values and range data of object(s) indicate that object(s) are within a collision zone or on a collision trajectory.

A further embodiment of any of the foregoing systems, wherein the cockpit notification system can include an audible alarm that is activated when the calculated position values and range data indicates one or more of the object(s) in the scene has a combination of an object range and an object direction relative to the aircraft corresponding to a risk of collision.

A further embodiment of any of the foregoing systems, wherein the cockpit notification system can include a display device configured to display the one or more images of the scene annotated with the calculated position values and range data.

A further embodiment of any of the foregoing systems, wherein the one or more cameras can include a plurality of cameras.

A further embodiment of any of the foregoing systems, wherein the image processor can be further configured to associate the identified pixel coordinates corresponding to a subset of the plurality of light-sensitive pixels with corresponding pattern features of the spatially-patterned light.

A further embodiment of any of the foregoing systems can further include a timing controller configured to generate a first command, in response to which the one or more cameras forms one or more first images of the scene. The timing controller can be further configured to generate a second command, in response to which the light projector projects the spatially-patterned light onto the scene, and, coinciding with the projection of the spatially-patterned light, the one or more cameras form one or more second images of the scene.

A further embodiment of any of the foregoing systems, wherein the image processor can be configured to calculate one or more difference images based on the difference(s) between the one or more first images and the one or more second images, respectively.

A further embodiment of any of the foregoing systems, wherein the image processor can be configured to determine pixel boundaries of the object(s) in the scene.

A further embodiment of any of the foregoing systems, wherein the subset of the plurality of light-sensitive pixels is a first subset. The image processor can be further configured to calculate three-dimensional spatial location values and to compute range data corresponding to a second subset of the plurality of light-sensitive pixels, and the second subset includes pixels that lie within the determined pixel boundaries of the object(s) in the scene but are not included in the first subset.

Some embodiments relate to method for generating an alert signal of a potential aircraft collision. The method includes projecting light of a spatial pattern from one or more projector locations onto a scene, thereby illuminating a spatially-patterned portion of the scene. The method includes receiving light reflected from the scene. The method includes focusing the received light onto a focal plane array comprising a plurality of light-sensitive pixels, thereby forming an image of the scene, the image comprising pixel data generated by the plurality of light-sensitive pixels. The method includes identifying pixel coordinates corresponding to pixels upon which the projected light of the spatial pattern and reflected from the spatially-patterned portion of the scene is focused. The method also includes calculating spatial location values and range value data of object(s) in the scene from which light of the spatial pattern projected from the one or more projector locations is reflected. The calculating range value data of object(s) in the scene is based on the one or more projector locations, a location at which the light reflected from the scene is received and focused, and the identified pixel coordinates.

The method of the preceding paragraph can optionally include, additionally and/or alternatively, any one or more of the following features, configurations and/or additional components:

A further embodiment of the foregoing method can further include activating an audible alarm when the calculated position values and range data indicates one or more of the object(s) in the scene has a combination of a range and a direction relative to the aircraft corresponding to a risk of collision.

A further embodiment of any of the foregoing methods can further include displaying the one or more images of the scene annotated with the calculated position values and range data.

A further embodiment of any of the foregoing methods can further include associating the identified pixel locations corresponding to pixels upon which the projected light of the spatial pattern and reflected from the spatially-patterned portion of the scene is focused with corresponding pattern locations of the projected light of the spatial pattern.

A further embodiment of any of the foregoing methods can further include generating a first command, in response to which a first image of the scene is formed.

A further embodiment of any of the foregoing methods can further include generating a second command, in response to which the light projector projects the light of the spatial pattern onto the scene, and, while the light of the spatial pattern illuminates the spatially-patterned portion of the scene, the one or more cameras form one or more second images of the scene.

A further embodiment of any of the foregoing methods can further include calculating one or more difference images based on the difference(s) between the one or more first images, and the one or more second images, respectively.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft collision alerting system comprising:
   one or more light projectors mounted at one or more projector locations on an aircraft and configured to project spatially-patterned light from the one or more light projectors onto a scene external to the aircraft, thereby illuminating a spatially-patterned portion of the scene;
   one or more cameras mounted at one or more camera locations on the aircraft, respectively, each of the one or more cameras configured to receive light reflected from the scene, and further configured to focus the received light onto a focal plane array comprising a plurality of light-sensitive pixels, thereby forming an image of the scene, the image comprising pixel data generated by the plurality of light-sensitive pixels; and
   an image processor configured to identify pixel coordinates corresponding to a subset of the plurality of light-sensitive pixels upon which the spatially-patterned light projected by the one or more light projectors and reflected from the spatially-patterned portion of the scene is focused, the image processor further configured to use triangulation, based on the one or more projector locations of the one or more light projectors, the one or more camera locations of the one or more cameras and the identified pixel coordinates, to calculate position values and range data of object(s) in the scene from which the spatially-patterned light projected by the light projector is reflected.

2. The aircraft collision alerting system of claim 1, wherein the spatially-patterned light comprises a series of spatially-separated lines or points of light.

3. The aircraft collision alerting system of claim 1, wherein the spatially-patterned light projected by the light projector comprises infrared light.

4. The aircraft collision alerting system of claim 3, wherein the spatially-patterned light projected by the light projector comprises infrared light having a wavelength corresponding to a lower solar intensity portion or to an atmospheric absorption band.

5. The aircraft collision alerting system of claim 3, wherein the camera is an infrared camera and the light-sensitive pixels are sensitive to infrared.

6. The aircraft collision alerting system of claim 1, further comprising a cockpit notification system configured to generate an alert signal if the calculated position values and range data of object(s) indicate that object(s) are within a collision zone or on a collision trajectory.

7. The aircraft collision alerting system of claim 6, wherein the cockpit notification system includes an audible alarm that is activated when the calculated position values and range data indicates one or more of the object(s) in the scene has a combination of an object range and an object direction relative to the aircraft corresponding to a risk of collision.

8. The aircraft collision alerting system of claim 6, wherein the cockpit notification system includes a display device configured to display the one or more images of the scene annotated with calculated position values and range data.

9. The aircraft collision alerting system of claim 1, wherein the one or more cameras comprises a plurality of cameras.

10. The aircraft collision alerting system of claim 1, wherein the image processor is further configured to associate the identified pixel coordinates corresponding to a subset of the plurality of light-sensitive pixels with corresponding pattern features of the spatially-patterned light.

11. The aircraft collision alerting system of claim 1, further comprising:
   a timing controller configured to generate a first command, in response to which the one or more cameras forms one or more first images of the scene, the timing controller further configured to generate a second command, in response to which the light projector projects the spatially-patterned light onto the scene, and, coinciding with the projection of the spatially-patterned light, the one or more cameras form one or more second images of the scene.

12. The aircraft collision alerting system of claim 11, wherein the image processor is configured to calculate one or more difference images based on the difference(s) between the one or more first images and the one or more second images, respectively.

13. The aircraft collision alerting system of claim 11, wherein the image processor is configured to determine pixel boundaries of the object(s) in the scene.

14. The aircraft collision alerting system of claim 13, wherein the subset of the plurality of light-sensitive pixels is a first subset, the image processor is further configured to calculate three-dimensional spatial location values and to compute range data corresponding to a second subset of the plurality of light-sensitive pixels, and the second subset includes pixels that lie within the determined pixel boundaries of the object(s) in the scene but are not included in the first subset.

15. A method for generating an alert signal of a potential aircraft collision, the method comprising steps of:
   projecting light of a spatial pattern from one or more projector locations onto a scene, thereby illuminating a spatially-patterned portion of the scene, using one or more light projectors;
   receiving light reflected from the scene, using one or more cameras;

focusing the received light onto a focal plane array comprising a plurality of light-sensitive pixels, thereby forming an image of the scene, the image comprising pixel data generated by the plurality of light-sensitive pixels, using the one or more cameras;

identifying pixel coordinates corresponding to pixels upon which the projected light of the spatial pattern and reflected from the spatially-patterned portion of the scene is focused, using an image processor; and calculating spatial location values and range value data of object(s) in the scene from which light of the spatial pattern projected from the one or more projector locations is reflected, wherein the calculating range value data of object(s) in the scene is based on the one or more projector locations, a location at which the light reflected from the scene is received and focused, and the identified pixel coordinates, using the image processor.

16. The method for generating an alert signal of a potential aircraft collision of claim 15, further comprising:

activating an audible alarm when the calculated position values and range data indicates one or more of the object(s) in the scene that has a combination of a range and a direction relative to the aircraft corresponding to a risk of collision.

17. The method for generating an alert signal of a potential aircraft collision of claim 15, further comprising:

displaying the one or more images of the scene annotated with the calculated position values and range data.

18. The method for generating an alert signal of a potential aircraft collision of claim 15, further comprising:

associating the identified pixel locations corresponding to pixels upon which the projected light of the spatial pattern and reflected from the spatially patterned portion of the scene is focused with corresponding pattern locations of the projected light of the spatial pattern.

19. The method for generating an alert signal of potential aircraft collision of claim 15, further comprising:

generating a first command, in response to which a first image of the scene is formed; and generating a second command, in response to which the light projector projects the light of the spatial pattern onto the scene, and, while the light of the spatial pattern illuminates the spatially-patterned portion of the scene, the one or more cameras form one or more second images of the scene.

20. The method for generating an alert signal of a potential aircraft collision of claim 15, further comprising:

calculating one or more difference images based on the difference(s) between the one or more first images, and the one or more second images, respectively.

* * * * *